C. E. MORRISON.
SHOCK COMPRESSOR.
APPLICATION FILED JUNE 12, 1912.
1,043,026.
Patented Oct. 29, 1912.
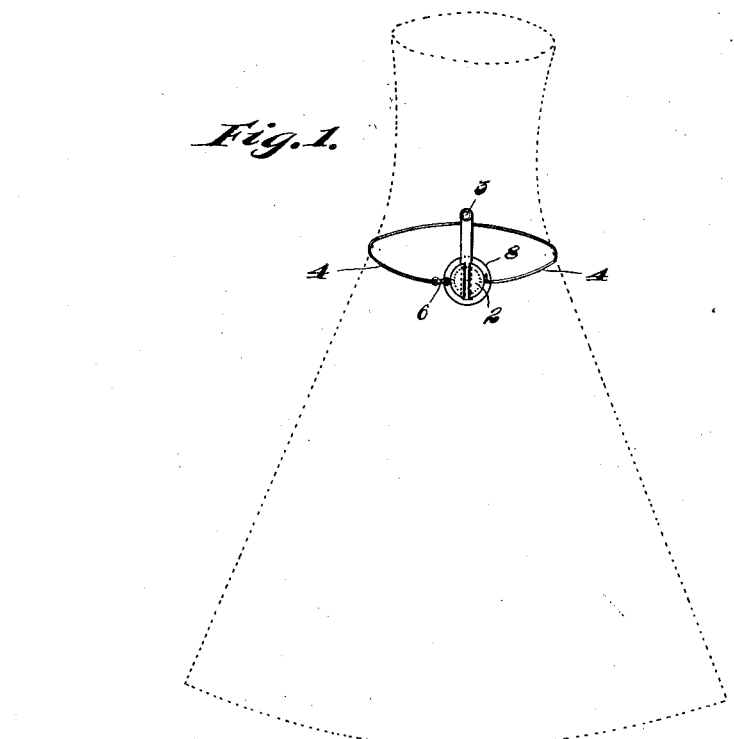
Fig. 1.
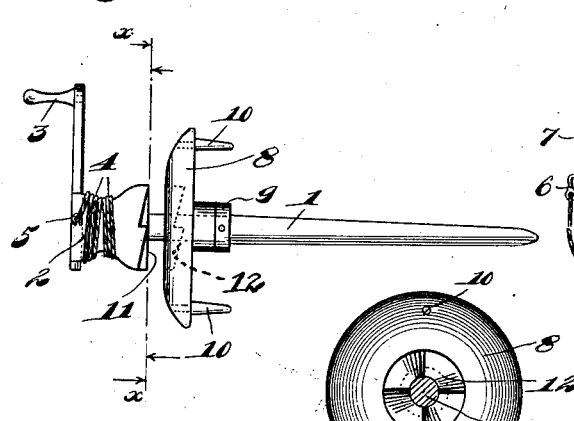
Fig. 2.
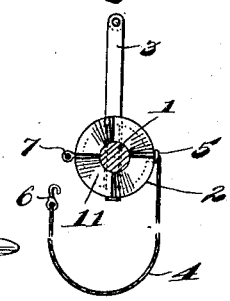
Fig. 4.
Fig. 3.
Witnesses:
C. E. Wessels.
A. A. Olson
Inventor:
Charlie E. Morrison,
By Joshua H. Potts
his Attorney.
COLUMBIA PLANOGRAPH CO., WASHINGTON, D. C.

UNITED STATES PATENT OFFICE.

CHARLIE E. MORRISON, OF SHELDON, ILLINOIS.

SHOCK-COMPRESSOR.

1,043,026.  Specification of Letters Patent.  Patented Oct. 29, 1912.

Application filed June 12, 1912.  Serial No. 703,175.

*To all whom it may concern:*

Be it known that I, CHARLIE E. MORRISON, a citizen of the United States, and a resident of the city of Sheldon, county of Iroquois, and State of Illinois, have invented certain new and useful Improvements in Shock-Compressors, of which the following is a specification.

My invention relates to improvements in shock compressors, and has for its object the production of a device of this character designed for use especially in compressing shocks of corn preparatory to the placing of the cord around the shock to permanently secure the same in compressed condition.

A further object is the production of a compressor as mentioned, which will be of durable and economical construction and through the medium of which a shock may be readily and expeditiously compressed.

Other objects will appear hereinafter.

With these objects in view, my invention consists in the combinations and arrangements of parts hereinafter described and claimed.

My invention will be more readily understood by reference to the accompanying drawing forming a part of this specification, and in which—

Figure 1 is a perspective view of my shock compressor in use, the same being shown applied to a shock which is shown in dotted lines, Fig. 2 is a side elevation of the device detached, and Figs. 3 and 4 are sections taken on line $x$ $x$ of Fig. 2, looking in opposite directions from said line.

The preferred form of construction, as illustrated in the drawing, comprises a substantially cylindrical elongated thrust-pin 1, one end of which is tapered so as to facilitate insertion thereof into the shock which it is desired to compress. Fixed to the opposite end of the thrust-pin 1 is a spool 2, and detachably connected with said spool is a handle 3 through the medium of which said spool and hence the thrust-pin 1 may be manually rotated.

Coöperating with the spool 2 is a flexible compressing-rope 4, one extremity 5 of said rope being permanently secured to the spool 2, as clearly shown in the several views. The opposite extremity of said rope is provided with a hook or other suitable engaging device 6 for detachable engagement with an eye 7 which is provided at the opposite side of the spool 2, as clearly shown in Fig. 4.

The thrust-pin 1 is rotatably and slidably mounted in a circular base plate 8 which is interposed between the spool 2 and a collar 9 fixed to said thrust-pin. Projecting from the plate 8 are diametric tapering studs 10 adapted, when said plate is positioned in engagement with a shock, to pierce the latter in order to lock said base plate against relative rotation.

In using the device, the tapered end of thrust-pin 1 is first thrust into the side of the shock which it is desired to compress, until the plate 8 engages against the side of the shock with the studs 10 piercing said shock. The free end of the rope 4 is then thrown around the shock and the member 6 engaged with the eye 7 of the spool 2. The handle 3 is then rotated to effect the winding of the ends of rope 4 upon the spool so as to draw said rope tightly around the shock in order to compress the latter. The drawing of said rope taut around the shock causes the same to draw the spool 2 into engagement with the plate 8. The contacting portions of said spool and plate are provided with coöperating clutch teeth 11 and 12 respectively, so that when said spool is moved into engagement with said plate by reason of the compressing action of the rope, as just mentioned, said plate will operate to prevent retrograde rotation of said spool and thus serve to hold the rope in compressing relation with the shock to permit of the shock being permanently tied in the usual manner. After tying of the shock it is only required, in order to detach the device, to draw the thust-pin 1 outwardly slightly so as to disengage the clutch teeth 11 and 12, whereupon said thrust-pin may be reversely rotated in order to effect detachment thereof from the shock.

The device is simple and economical in construction and, through its employment, shocks may be readily and expeditiously compressed preparatory to tying of the same.

While I have illustrated and described the preferred form of construction for carrying my invention into effect, this is capable of variation and modification without departing from the spirit of the invention. I, therefore, do not wish to be limited to the exact details of construction set forth, but desire to avail myself of such variations and modifications as come within the scope of the appended claims.

Having described my invention, what I claim as new and desire to secure by Letters Patent, is:

1. A shock compressor comprising, in combination, a thrust-pin; a base plate in which said thrust-pin is rotatably and slidably mounted; a spool fixed to said thrust-pin and adapted to be moved into engagement with said base plate; means on the contacting surfaces of said spool and base plate whereby said plate, when engaged by said spool, is adapted to prevent retrograde rotation of said spool; and a compressing-rope having its ends connected with said spool, said rope being adapted, when drawn to compress the shock, to move said spool into engagement with said base plate, substantially as described.

2. A shock compressor comprising, in combination, a thrust-pin; a base plate in which said thrust-pin is rotatably and slidably mounted; a spool fixed to said thrust-pin and adapted to be moved into engagement with said base plate; clutch teeth on the contacting surfaces of said spool and base plate whereby said plate, when engaged by said spool, is adapted to prevent retrograde rotation of said spool; and a compressing-rope having its ends connected with said spool, said rope being adapted, when drawn to compress the shock, to automatically move said spool into engagement with said base plate, substantially as described.

3. A shock compressor comprising, in combination, a thrust-pin adapted to pierce the shock to be compressed; a handle at one end of said thrust-pin for manually rotating the same; a base plate in which said thrust-pin is rotatably and slidably mounted; a spool fixed to said thrust-pin and adapted to be moved into engagement with said base plate; means on the contacting surfaces of said spool and base plate whereby said plate, when engaged by said spool, is adapted to prevent retrograde rotation of said spool; and a compressing-rope having its end connected with said spool, said rope being adapted, when drawn to compress the shock, to move said spool into engagement with said base plate, substantially as described.

4. A shock compressor comprising, in combination, a thrust-pin; a base plate in which said thrust-pin is rotatably and slidably mounted; means on said base plate adapted for engagement with the shock engaged to lock said base plate against relative rotation; a spool fixed to said thrust-pin and adapted to be moved into engagement with said base plate; clutch teeth on the contacting surfaces of said spool and base plate whereby said plate, when engaged by said spool, is adapted to prevent retrograde rotation of said spool; and a compressing-rope having its ends connected with said spool, said rope being adapted, when drawn to compress the shock, to automatically move said spool into engagement with said base plate, substantially as described.

5. A shock compressor comprising, in combination, a thrust-pin adapted to pierce the shock to be compressed; a base plate in which said thrust-pin is rotatably and slidably mounted; diametric outwardly projecting pins on said base plate adapted to pierce the shock engaged to lock said plate against relative rotation; a spool fixed to said thrust-pin and adapted to be moved into engagement with said base plate; clutch teeth on the contacting surfaces of said spool and base plate whereby said plate, when engaged by said spool, is adapted to prevent retrograde rotation of said spool; and a compressing-rope having its ends connected with said spool, said rope being adapted, when drawn to compress the shock, to automatically move said spool into engagement with said base plate, substantially as described.

In testimony whereof I have signed my name to this specification in the presence of two subscribing witnesses.

CHARLIE E. MORRISON.

Witnesses:
W. L. McCloud,
R. H. Mason.

Copies of this patent may be obtained for five cents each, by addressing the "Commissioner of Patents, Washington, D. C."